(12) United States Patent
Chopra et al.

(10) Patent No.: US 11,442,819 B2
(45) Date of Patent: Sep. 13, 2022

(54) SPECIALIZED METADATA FOR MANAGING AND SEARCHING BACKUP DATA STORED ON A CLOUD-BASED OBJECT STORAGE

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN); Ravi Vijayakumar Chitloor, Bengaluru (IN); Himanshu Arora, Bangalore (IN); Tushar Dethe, Bangalore (IN); Jigar Bhanushali, Valsad (IN); Deependra Singh, Kanpur (IN); Prabhat Kumar Dubey, Chikkanagamangala (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 17/150,199

(22) Filed: Jan. 15, 2021

(65) Prior Publication Data
US 2022/0229735 A1 Jul. 21, 2022

(51) Int. Cl.
*G06F 11/14* (2006.01)

(52) U.S. Cl.
CPC ...... *G06F 11/1464* (2013.01); *G06F 11/1469* (2013.01); *G06F 2201/84* (2013.01)

(58) Field of Classification Search
CPC ............ G06F 11/1464; G06F 11/1469; G06F 11/1451; G06F 2201/84; G06F 11/1448; G06F 11/1458; G06F 11/1471; G06F 8/658
See application file for complete search history.

(56) References Cited

U.S. PATENT DOCUMENTS

| | | | | |
|---|---|---|---|---|
| 8,769,055 B2 * | 7/2014 | Murphy | .............. | G06F 11/3055 709/219 |
| 10,496,599 B1 * | 12/2019 | Haravu | ............... | G06F 11/1451 |
| 10,701,153 B1 * | 6/2020 | Haravu | ................... | H04L 67/10 |
| 10,789,205 B1 * | 9/2020 | Haravu | ............... | G06F 11/1451 |
| 10,983,908 B1 * | 4/2021 | Zou | ...................... | G06F 12/0253 |
| 2013/0275379 A1 * | 10/2013 | Trebas | .................. | G06F 11/006 707/E17.005 |

(Continued)

*Primary Examiner* — Merilyn P Nguyen
(74) *Attorney, Agent, or Firm* — Dergosits & Noah LLP; Todd A. Noah (57) ABSTRACT

Described is a system (and method) for managing specialized metadata that may be used to manage and search incremental backup data stored on a cloud-based object storage. The system may create and store such metadata as part of a specialized metadata database that includes a data catalog and a backup catalog. The system may leverage the metadata database to initiate operations to efficiently manage incremental backup data stored on the object storage. For example, the metadata may be relied upon to efficiently reconstruct (e.g. synthetically) the client data to a point-in-time of any incremental backup. In addition, the metadata may include properties of the backed-up data, which are maintained separately from the backup data stored as objects. Accordingly, these properties may be searched to identify and locate backup data without having to retrieve the stored objects.

20 Claims, 5 Drawing Sheets

(56) References Cited

U.S. PATENT DOCUMENTS

| | | | |
|---|---|---|---|
| 2016/0117226 A1* | 4/2016 | Hetrick | G06F 11/1451 |
| | | | 711/162 |
| 2017/0262204 A1* | 9/2017 | Dornemann | G06F 3/065 |
| 2018/0225177 A1* | 8/2018 | Bhagi | G06F 16/164 |
| 2018/0253361 A1* | 9/2018 | Dhatrak | G06F 11/3034 |
| 2018/0267861 A1* | 9/2018 | Iyer | G06F 9/45558 |
| 2018/0285201 A1* | 10/2018 | Bangalore | G06F 11/2097 |
| 2018/0373597 A1* | 12/2018 | Rana | G06F 11/1448 |
| 2019/0121705 A1* | 4/2019 | Mayo | G06F 16/2365 |
| 2022/0138051 A1* | 5/2022 | Yelheri | G06F 3/0641 |
| | | | 711/162 |

\* cited by examiner

```
┌─────────────────────────────────────────────────────────────┐
│ PERFORM A BACKUP OF CLIENT DATA TO A SET OF OBJECTS STORED ON│
│ AN OBJECT STORAGE, THE CLIENT DATA INCLUDING ONE OR MORE    │─ 301
│ DATA ITEMS, AND EACH DATA ITEM ASSOCIATED WITH ONE OR MORE  │
│ PROPERTIES THAT ARE STORED AS PART OF THE DATA ITEM         │
└─────────────────────────────────────────────────────────────┘
                              ↓
┌─────────────────────────────────────────────────────────────┐
│ OBTAIN, FOR EACH OF THE DATA ITEMS, THE ASSOCIATED PROPERTIES│─ 302
└─────────────────────────────────────────────────────────────┘
                              ↓
┌─────────────────────────────────────────────────────────────┐
│ STORE THE ASSOCIATED PROPERTIES AS PART OF A SET OF ENTRIES │
│ WITHIN A DATA CATALOG, THE ASSOCIATED PROPERTIES FOR EACH   │─ 303
│ DATA ITEM STORED AS PART OF AN CORRESPONDING ENTRY THAT     │
│ STORES METADATA OF THE DATA ITEM                            │
└─────────────────────────────────────────────────────────────┘
                              ↓
┌─────────────────────────────────────────────────────────────┐
│ RECEIVE A REQUEST TO IDENTIFY A FIRST DATA ITEM STORED      │─ 304
│ WITHIN THE SET OF OBJECTS, THE REQUEST INCLUDING A SEARCH VALUE│
└─────────────────────────────────────────────────────────────┘
                              ↓
┌─────────────────────────────────────────────────────────────┐
│ SEARCH THE SET OF ENTRIES WITHIN THE DATA CATALOG DATA USING│─ 305
│ THE SEARCH VALUE                                            │
└─────────────────────────────────────────────────────────────┘
                              ↓
┌─────────────────────────────────────────────────────────────┐
│ IDENTIFY A FIRST ENTRY, AMONGST THE SET OF ENTRIES WITHIN   │
│ THE DATA CATALOG, ASSOCIATED WITH THE FIRST DATA ITEM BASED │─ 306
│ ON THE SEARCH VALUE MATCHING THE METADATA STORED BY THE     │
│ FIRST ENTRY                                                 │
└─────────────────────────────────────────────────────────────┘
                              ↓
┌─────────────────────────────────────────────────────────────┐
│ RETRIEVE THE FIRST DATA ITEM FROM A FIRST OBJECT, AMONGST   │
│ THE SET OF OBJECTS, BASED ON THE METADATA STORED BY THE     │─ 307
│ FIRST ENTRY INDICATING THE FIRST DATA ITEM IS STORED WITHIN │
│ THE FIRST OBJECT                                            │
└─────────────────────────────────────────────────────────────┘
```

SPECIALIZED METADATA FOR MANAGING AND SEARCHING BACKUP DATA STORED ON A CLOUD-BASED OBJECT STORAGE

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. As part of the data protection and recovery infrastructure, clients may rely on third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be stored as part of the incremental backup. Accordingly, backup data from previous backups may need to be preserved on the object storage to perform a full data recovery. However, managing and tracking data relationships between different backups becomes increasingly difficult. Moreover, although object storage providers have native search tools, these search tools may not account for data being stored as part of an incremental backup infrastructure. As a result, searching the backup data stored on the object storage is often inefficient and resource intensive. Accordingly, there is a continued need to efficiently manage incremental backup data stored on a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for managing specialized metadata that may be used to manage and search backup data stored on a cloud-based object storage. The system may create and store such metadata as part of a specialized metadata database. In some embodiments, the system may include a server (or gateway) that provides a backup service to a client device. Accordingly, the server may leverage the metadata database to initiate operations to efficiently manage backup data stored on the object storage. For example, in order to conserve storage space, the server (e.g. as part of the backup service) may perform incremental backups when storing client backup data to the object storage. Accordingly, the server may rely on a backup catalog maintained as part of the metadata database to efficiently reconstruct (e.g. synthetically) the client data to a point-in-time of any incremental backup as if a full backup were performed.

In addition, the server may provide the ability to efficiently search the backup data stored on the object storage. For example, as a result of performing incremental backups, backup data may be stored as objects associated with different backups. Accordingly, to provide efficient backup data search capabilities without having to access the stored objects, the server may maintain a data catalog as part of the metadata database. This the data catalog may be maintained separately from the objects and may store various types of metadata such as properties associated with the backed-up client data that may be searched. For example, the client data may include emails that are backed up to the object storage and stored as objects. Accordingly, the server may store email properties as part of an independent data catalog. As a result, backed-up emails may be searched by querying the data catalog using various email characteristics (e.g. subject, sender, time sent, etc.) and without having to retrieve the stored objects.

The metadata database may also be leveraged to efficiently allocate backup data within the object storage. For example, the server may rely on the metadata database to reallocate backup data to new objects. The server may also rely on the metadata database to re-tier objects to various storage tiers within the object storage.

Accordingly, the specialized metadata database provides the ability to perform various operations to efficiently manage backup data stored on the object storage.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
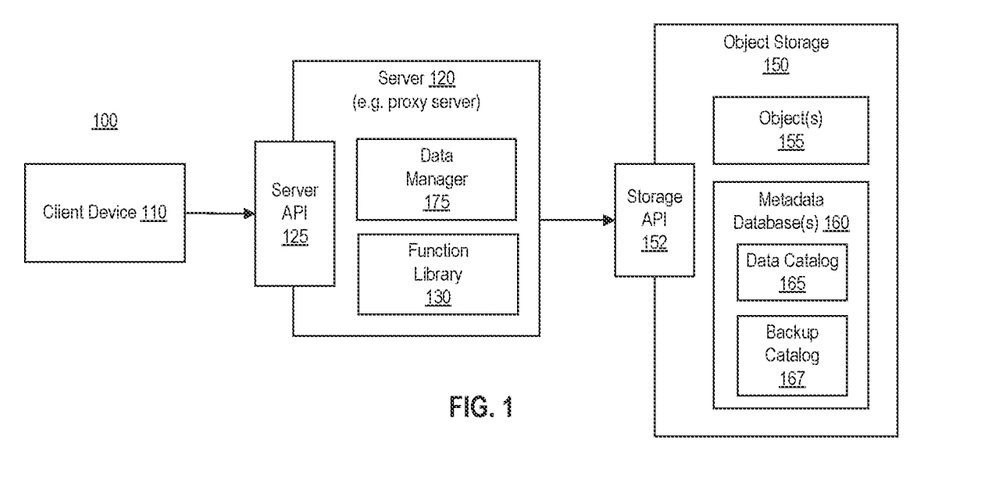
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 (or client data stored by the client device 110) may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. Accordingly, the client device 110 may be a source of client data to be backed up to the object storage 150. In some embodiments, the client data may include data items. For example, the data items may include emails. In some embodiments, the client device 110 may include, or work in conjunction with, a cloud-based component (e.g. server) that manages client data. For example, the client device 110 may include a server (e.g. email server) that manages client data as part of a cloud-based service (e.g. cloud-based email service).

The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g. depending on the cloud-based storage provider). In some embodiments, the object storage 150 may include various storage tiers (not shown). Accordingly, objects 155 (e.g. backed up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs.

As described, the server 120 may act as an intermediary for managing client backup data stored on the object storage 150. In some embodiments, the server 120 may include, or work in conjunction with, various backup components (e.g.

products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. It should be noted that the same set of operations provided by the server API 125 may be used by the client device 110 irrespective of the type of object storage 150 (e.g. object storage provider). To provide such object-storage-agnostic functionality, the server 120 may include a function library 130 that includes object-storage-specific (or provider-specific) functions. In other words, the function library 130 may include a specific set of functions that are configured to interact with a particular object storage (e.g. object storage provider). Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings associated with managing backup data stored on the object storage 150 as further described herein. In addition, the data manager 175 may direct (or control, initiate, etc.) other components of the operating environment 100 to perform various processes as further described herein.

To further improve potential storage and recovery efficiency, the server 120 may leverage a specialized metadata database 160. The metadata database 160 may be maintained by the server 120. The metadata database 160 may be an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 152.

The metadata database 160 may store metadata associated with client data stored on the client device 110 and/or backed up to the object storage 150. The metadata database 160 may also store various types of backup information associated with the backed up client data.

For example, the metadata database 160 may include a data catalog (or table, database, index, etc.) 165. The data catalog 165 may store information associated with the data stored as part of each backup. In some embodiments, the data catalog 165 may be maintained for a particular account (or sub-account) associated with a client. For example, a data catalog 165 may be maintained for each email account (or user, mailbox, address, etc.). Accordingly, in such embodiments, a data catalog 165 (or instance thereof) may be updated after each backup is performed. In some embodiments, the client data may be in the form of a data item such as a file (or data file). Accordingly, the metadata stored as part of the data catalog 165 may also be stored as part of such files that are backed up to the object storage. For example, the data items may include client emails that are stored as email files on the client device 110. These client emails may also store certain metadata (or properties) associated with each email. Accordingly, such metadata (or properties) may be stored as part of the data catalog 165. For example, as part of a backup, this metadata may be obtained from the client device (or associated API), extracted from the data items to be backed up, or obtained from another source such as a database maintained by the client device. Such metadata may then be stored to the data catalog 165. Accordingly, the data catalog 165 may then be searched to obtain information about the backed-up client data rather than having to search the contents of the objects that store the backed-up client emails/files.

The metadata may also include any information (e.g. properties) that may be associated with data or a file. For example, the metadata may include information related to a time (e.g. last accessed time, last modified time, creation time, etc.) associated with the data, author, importance, read only, storage location, etc. In some embodiments, the client data may include emails, and the metadata associated with emails may include a subject, sender, recipient(s), sent time, whether the email was sent with attachments, whether the email is live, whether the email is read/unread, whether the email is flagged by a user, marked as important or urgent, a priority level, a due date or deadline, a meeting time, and any other properties that may be associated with an email.

The data catalog 165 may also store various types of backup information associated with the backed up client data. For example, the backup information may include a point-in-time the client data was backed up, a storage location of the backed-up client data, an object ID to which the backed up client data is stored, and various other types of information.

The metadata database 160 may also include a backup catalog (or index, table, database, etc.) 167 that stores information associated with each backup performed to the object storage 150. For example, the backup catalog 167 may include backup times specifying when each backup was performed, a backup expiration time, a type of backup (e.g. full or incremental), and any other information that may be associated with performing a backup. In addition, the backup catalog 167 may also include a list of objects required to perform a full restore to each of the backup times.

Accordingly, the metadata database 160 may be leveraged by the server 120 when managing and identifying backup data as further described herein.

Figure 2A:
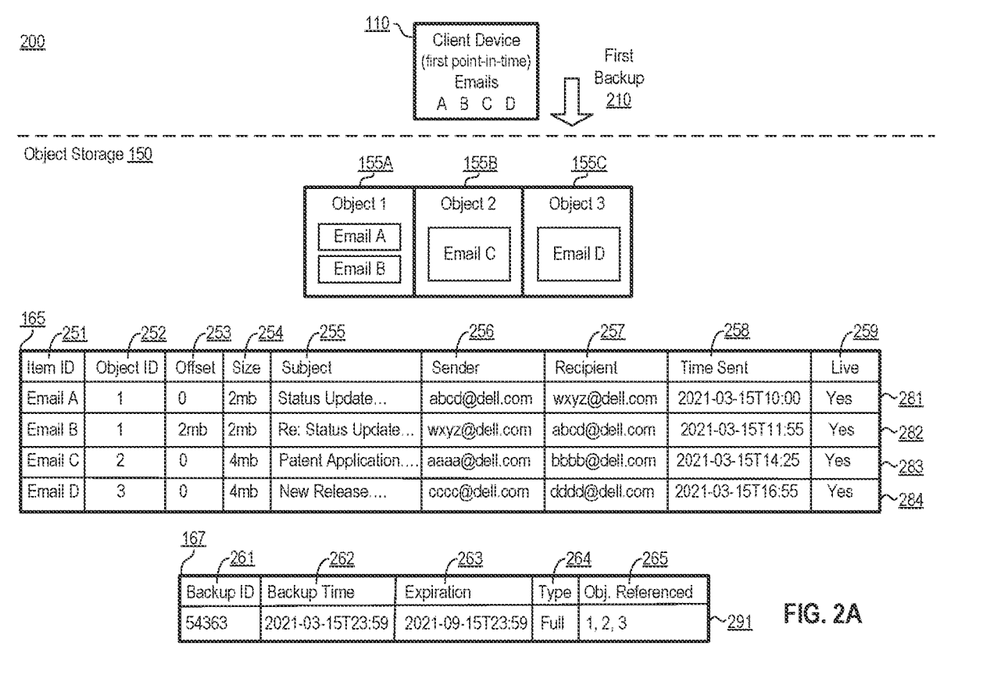
FIG. 2A is a diagram illustrating an example of the metadata that may be stored as part of a metadata database in response to performing a backup according to one or more embodiments of the disclosure.
Figure 2B:
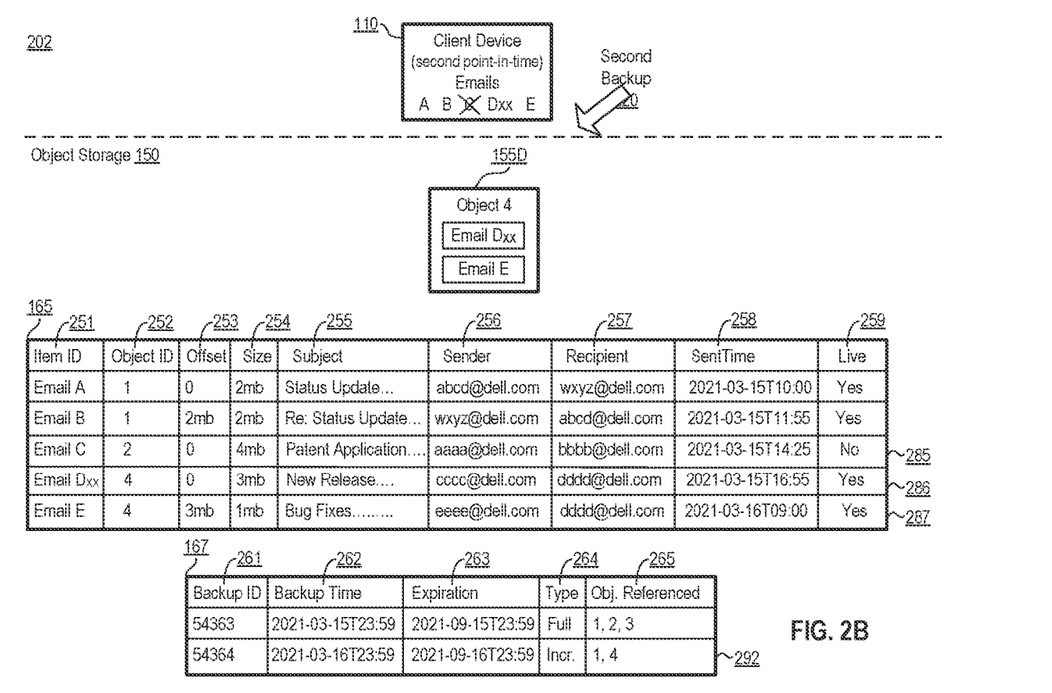
FIG. 2B is a diagram illustrating an example of the metadata that may be stored as part of a metadata database in response to performing an incremental backup according to one or more embodiments of the disclosure.

FIGS. 2A and 2B are diagrams illustrating an example of the metadata that may be stored as part of a metadata database in response to performing a backup according to one or more embodiments of the disclosure. It should be noted that in this example, the client data (e.g. data items) includes emails although any type of data is contemplated.

Referring first to FIG. 2A, as shown in diagram 200, the client device 110 at a first point-in-time stores emails A, B, C, and D. Accordingly, as part of the first backup 210, which in this example is a full backup, the server stores the emails within newly created objects 155A, 155B, and 155C of the object storage. In other words, objects 155A, 155B, and 155C may be associated with the first backup 210 and/or the first point-in-time. In some embodiments, each object 155 may be configured to store a certain amount of data that is specialized for the type of data to be backed up. For example, each of the objects 155 may be configured to store an amount of data that is specialized for client emails (e.g. approximately 4 MB). Accordingly, to efficiently utilize storage space on the object storage, the server may perform a packing (or grouping, combining, etc.) of data based on the amount of data an object 155 is configured to store. Thus, in this example, the server may attempt to pack emails into each of the objects 155 such that each object stores approximately 4 MB of data. For example, the server may store (e.g. pack) emails A and B, which are approximately 2 MB each in size, within object 155A, and emails C and D, which are approximately 4 MB each in size, within objects 155B and object 155C respectively.

As described, the server may store metadata associated with the backed up client data as part of the metadata database. In particular, the metadata associated with the backed up client data may be stored as part of a data catalog 165. As shown, the data catalog 165 may store various types of information including an item identifier (ID) 251, an object identifier (ID) 252, an offset 253, the size 254 of the email, the subject 255 of an email, the sender 256 of the email, the receipt(s) 257 of the email, the time sent 258 of the email, and whether the email is live 259. In some embodiments, the information stored as part of the data catalog 165 may include properties associated with the client data. For example, the properties of the data items (e.g. emails) shown in this example include fields 255-259. It should be noted that the properties (or fields) shown in the data catalog 165 are used as examples and that additional properties associated with an email (or other type of client data) may also be stored as part of the data catalog 165. For example, the additional types of properties (e.g. metadata) associated with an email may include read information (e.g. read/unread value) that indicates whether a particular email has been read by a user, flag information (e.g. flag value) that indicates whether a particular email had been flagged by a user, a priority level, time information such as a due date/deadline, meeting time, etc., and other types of information (e.g. properties) that may be associated with, or stored as part of, an email.

More specifically, in the example of diagram 200, the server stores entries 281-284 that correspond to emails A, B, C, and D respectively. As shown, each of the entries 281-284 identifies the object (e.g. via object ID 251) in which the corresponding email (e.g. identified by email ID 251) is stored. Emails A and B are both stored in object 1 155A, and accordingly, as shown in the data catalog 165, entry 282 specifies a 2 mb offset for email B, which corresponds to the size of email A (e.g. 2 mb). Accordingly, when retrieving email B, the server may use the offset to efficiently locate email B within object 1 155A. In addition, each of these entries may be associated with the first backup 210 and/or a point-in-time of the first backup 210 (e.g. a first point-in-time). For example, although not shown, the data catalog 165 may also include a backup identifier (ID) field indicating that emails A-D were backed up as part of the first backup 210. For instance, entries 281-284 may each store a value (e.g. 54363) that corresponds to the first backup 210 (e.g. as shown in the backup catalog 167).

Additionally, as described, the server may store metadata associated with each backup as part of the metadata database. In particular, the metadata associated with each backup may be stored as part of a backup catalog 167. For example, the server may update the backup catalog 167 in response to each backup performed. As shown, the backup catalog 167 may include a backup identifier (ID) 261, a backup time 262, backup expiration 263, backup type 264, and a referenced object list 265. The backup ID 261 may uniquely identify the backup performed. The backup time 262 may be a time associated with the performed backup. For example, the backup time 262 may be a point-in-time of when the backup was performed. The backup expiration 263, which may be user-configurable, may indicate when the data (or objects) associated with a backup is deemed expired (e.g. for deletion or re-tiering purposes). The backup type 264 may indicate whether the backup performed was a full or incremental backup. The referenced object list 265 may include a list of objects referenced by a particular backup. For example, the objects referenced by a particular backup may indicate which objects are required to perform a full restore (or recovery) to the point-in-time of the corresponding backup.

More specifically, as shown in the example of diagram 200, in response to performing the first backup 210, the server may update the backup catalog 167 to include (or add, create, etc.) entry 291, which is associated with the first backup 210. As shown, entry 291 includes a unique identifier "54363" as the backup ID 261. In some embodiments, the backup ID 261 may be linked to (or referenced by, associated with, etc.) entries in the data catalog 165 that correspond to the first backup 210 (e.g. entries 281-284). As shown, entry 291 indicates that the first backup 210 expires after 6 months (e.g. expiration 263 shown as 2021-09-15T23:59, which is 6 months after the backup time 262 shown as 2021-03-15T23:59). Entry 291 also indicates that the first backup 210 was a full backup (e.g. backup 353 specifies full backup). In addition, entry 291 includes objects 1, 2, and 3 (e.g. objects 155A, 155B, and 155C) as the referenced object list 265. In other words, to perform a full restore (or recovery) of the client data to the point-in-time associated with the first backup 310 (e.g. restoration of emails A, B, C, and D), the referenced object list 265 indicates that the server would need to retrieve the data stored in objects 155A, 155B, and 155C.

Now referring to FIG. 2B, after the first (or initial) backup 210, the server may perform a second (or subsequent) backup 220. As shown in diagram 202, since the first point-in-time, the changes to the emails stored by the client device 110 include the deletion of email C, the modification of email D (shown as Dxx), and the addition of new email E. Accordingly, the client device 110 at a second point-in-time stores emails A, B, modified email D, and new email E. Thus, as part of the second backup 220, which in this example is an incremental backup, the server may store only modified email D and new email E within a newly created object 4 155D. As shown, object 4 155D only stores modified email D and email E, and the previously backed up emails (e.g. emails A-D) are retained in objects 155A, 155B, and 155C. In other words, the data of objects 155A, 155B, and 155C are not copied to additional objects (e.g. object 4 155D) as part of the second backup 220. Instead, when a full restore (or recovery) to the second point-in-time is required, the server may combine the data of the referenced objects to create a complete dataset (e.g. emails A, B, D (as modified), and E).

Accordingly, as with the first backup 210, the server may store metadata associated with the backed up client data as part of a data catalog 165 (or instance thereof). More specifically, as shown in diagram 202, the server may update the data catalog 165 to include (or add, create, etc.) entries 285-287, which are associated with the second backup 220. As shown, entry 285 updates the previous entry (e.g. entry 283) to indicate that email C has been deleted. Specifically, the live 259 information of entry 285 is updated to indicate that email C is no longer live (e.g. dead or deleted). As referred to herein, live data may include data stored on the object storage that is still required for recovery purposes. For instance, live data may include backup data that does not correspond to client data that has been deleted. As referred to herein, dead data (or data this is not live) may include data (or an instance thereof) that is no longer required for recovery purposes. For example, dead data may include data stored on the object storage that corresponds to data that has been deleted from the client device. As another example, dead data may include data on the object storage that may be redundant or expired.

Continuing with the updates to the backup catalog 165, as shown, entry 286 updates the previous entry (e.g. entry 284) to indicate that email D (as modified) is stored in object 4 (e.g. object 4 155D). Specifically, the object ID 252 of entry 286 is updated to indicate that email D is stored in object 4. The server also updates the data catalog 165 to include entry 287, which corresponds to new email E. As shown, the object ID of entry 287 indicates that email E is stored in object 4 (e.g. object 4 144D).

In response to the second backup 220, as shown in diagram 202, the server may also update the backup catalog 167 to include (or add, create, etc.) entry 292, which is associated with the second backup 220. As shown, entry 292 includes a unique identifier "54364" as the backup ID 251. In some embodiments, the backup ID 261 of the second backup 220 (e.g. "54364") may be linked to (or referenced by, associated with, etc.) entries in the data catalog 165 that correspond to the second backup 220 (e.g. entries 285-287). As shown, entry 292 indicates that the second backup 220 expires after 6 months (e.g. expiration 263 shown as 2021-09-16T23:59, which is 6 months after the backup time 262 shown as 021-03-16T23:59). In addition, entry 292 includes objects 1, and 4 (e.g. objects 155A, and 155D) as the referenced object list 265. In other words, to perform a full restore of the client data to the point-in-time associated with the second backup 220 (e.g. restoration of emails A, B, D (as modified), and E), the referenced object list 265 indicates that the server would need to retrieve the data stored in objects 155A, and 155D.

In some embodiments, the server may store certain changes to client data exclusively within the metadata database (e.g. data catalog 165). In other words, certain changes to client data may be stored only within the metadata database and not within an object. For example, if the properties of client data have changed since the last backup, the server may store only the changes within the metadata database for further storage conservation. For instance, when an email has been deleted, the server may track (or record) the deletion within the metadata database and retain the email within the original object (e.g. as shown in diagram 202 for email C). As another example, when only an email property (e.g. read/unread, flag, priority, due date, meeting time, etc.) has changed since the last backup, the server may track (or record) the change exclusively within the metadata database and retain the original email properties stored in the object. Accordingly, the server may incorporate any changes to the email properties at the time of restoration (or recovery). To perform such restoration, the server may rely on the information stored within the metadata database.

It should be noted that although the data catalog 165 and backup catalog 167 are shown in the form of a table, any data structure or configuration is contemplated. In addition, the data catalog 165 and backup catalog 167 may be part of the same database (e.g. table), or separate tables that are linked (e.g. via the backup ID).

As a result of storing the metadata as part of the metadata database (e.g. data catalog 165 and backup catalog 167), the server may perform various efficient data management operations.

In some embodiments, the server may perform an efficient full restore (or recovery) of client data. For example, the server may perform the full restore in response to receiving a request to recover client data to a particular point-in-time (or recovery point-in-time). The full restore may include the server recovering (or recreating, restoring, reconstructing, etc.) all of the client data which existed at the particular point-in-time. For example, the server may receive a request to perform a full restore of client data to the point-in-time of the second backup 220. In response, the server may access the backup catalog 167, and in particular, lookup (or retrieve, obtain, identify, etc.) the referenced object list 256 of entry 292, which corresponds to the second backup 220. Based on this lookup, the system may determine that performing a full restore of the second backup 220 requires retrieving the data from objects 1, 4 (e.g. objects 155A, and 155D). Accordingly, to create the full dataset required for the full restore, the server may reconstruct emails A, B, D (as modified), and E from the retrieved objects 155A and 155D. In addition, if necessary, the server may merge the metadata entries that were stored exclusively within the metadata database with the reconstructed data.

In some embodiments, the server may perform an efficient search of backup data stored as objects within the object storage. For example, the server may efficiently search the backup data of the object storage by querying the metadata, which is maintained separately from the object as described above. For example, as shown in the examples of diagram 200/202, the server may store email properties as part of the metadata. As a result, backed-up emails may be searched based on various email properties without retrieving the stored objects. Instead, backed-up emails stored on the object storage may be identified and located efficiently by querying the data catalog 165. For example, the server may receive a request to search for backed-up emails based on a subject. Accordingly, the server may search the subject 255 fields of the data catalog for one or more email accounts, and determine if such an email is backed-up. If so, the server may obtain information associated with such a backed up email including the location (e.g. object to which the email is stored), the time the email was backed up (e.g. based on the backup time 262 of the linked backup catalog 167), and other information stored as part of the metadata database.

In some embodiments, the server may also efficiently allocate backup data within the object storage. For example, the server may rely on the metadata database to reallocate backup data to new objects. The server may also rely on the metadata database to re-tier objects to various storage tiers within the object storage.

Figure 3:
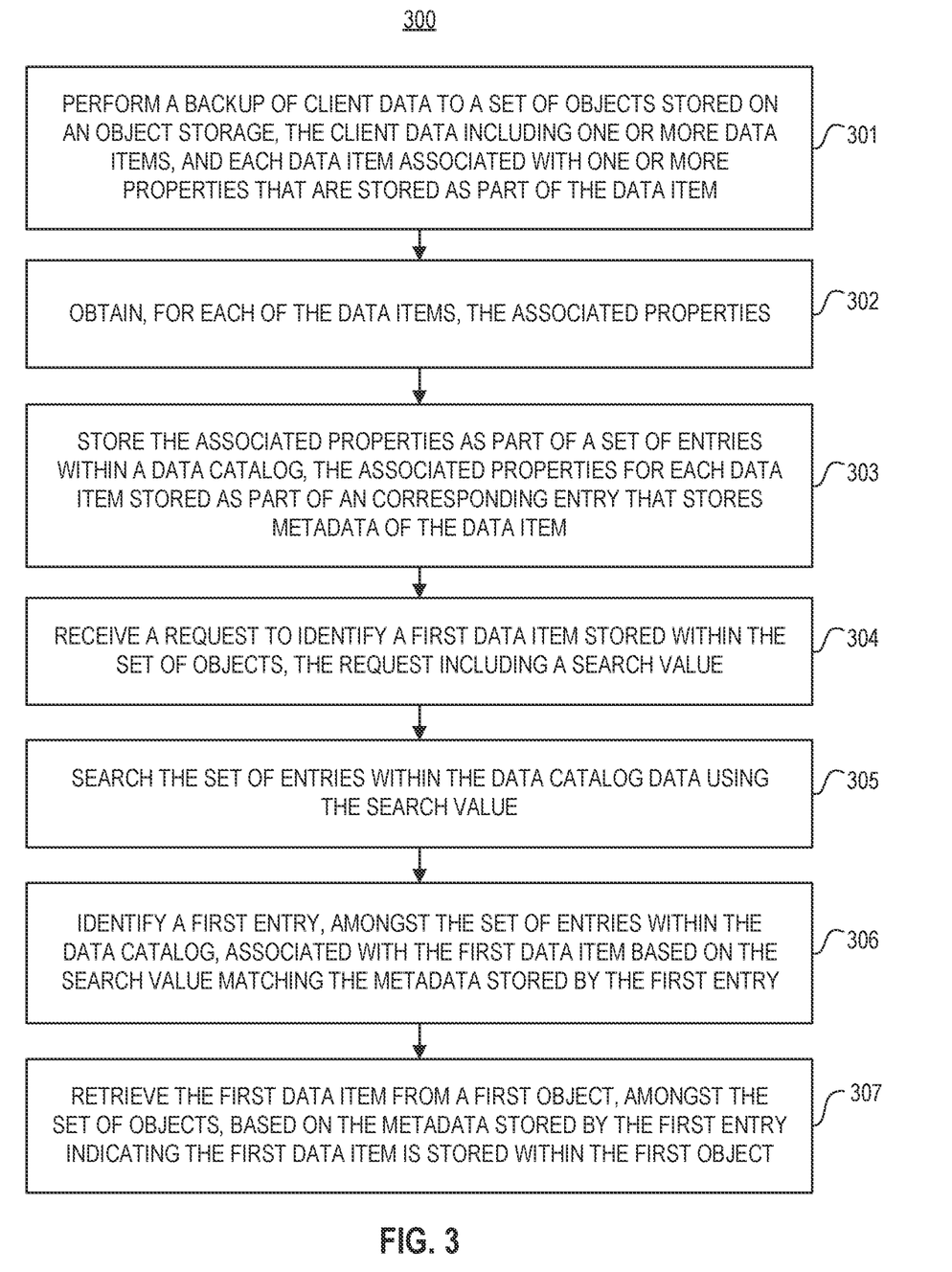
FIG. 3 is a flow diagram illustrating an example method of identifying backup data stored on an object storage based on metadata according to one or more embodiments of the disclosure.

FIG. 3 is a flow diagram illustrating an example method of identifying backup data stored on an object storage based on metadata according to one or more embodiments of the disclosure. Process 300 may use processing logic, which may include software, hardware, or a combination thereof. For example, process 300 may be performed by a system including one or more components described in operating environment 100 (e.g. server 120, data manager 175, etc.).

In 301, the system (e.g. server 120) may perform a backup of client data stored on a client device (e.g. client device 110) to a set of objects (e.g. object 155) stored on a cloud-based object storage (e.g. object storage 150). The client data may include one or more data items (e.g. emails), and each data item may be associated with one or more properties (e.g. properties 255-259) that are stored as part of the data item. For example, each data item may include an email, and accordingly, the one or more properties may include, for example, at least one of an email subject, sender, receipt, and sent time.

In 302, the system may obtain, for each of the data items, the associated properties. In some embodiments, the system may obtain the properties in response to performing the backup. As described, the system may obtain the properties using various methods. In some embodiments, the system may obtain the properties using an API. For example, the data items may include emails that are stored as part of an email application on the client device or an email server that works in conjunction with the client device. Accordingly, the email application may provide an API that allows the system to obtain (e.g. request) the properties associated with the emails. In some embodiments, the system may extract the properties from the data items as part of the backup or separate process. For example, the properties may be stored as part of an email file, and accordingly, the system may extract such properties (e.g. fields 255-258) from the email file.

In some embodiments, the performed backup may include an incremental backup (e.g. second backup 220) from a previously performed backup (e.g. first backup 210). Accordingly, obtaining the associated properties may include the system obtaining changes to the properties since the previously performed backup for at least some of the data items. In some embodiments, the changes to the properties of the data items may be obtained using an API. For example, the data items may include emails, and accordingly, an email application may provide an API method that provides the changes to the emails (e.g. delta) since a previous point-in-time (e.g. since the previous backup).

In 303, the system may store the associated properties as part of a set of entries (e.g. entries 281-284) within a data catalog (e.g. data catalog 165). Accordingly, the associated properties for each data item may be stored as part of a corresponding entry that stores metadata of the data item. For example, as shown in diagram 200, the data items may include emails (e.g. emails A-D), and accordingly, each email has a corresponding entry (e.g. each entry 281-284 corresponds to a respective email A-D).

In some embodiments, the system may also store backup metadata (e.g. metadata 261-265) associated with the backup as an entry (e.g. entry 291) within the backup catalog (e.g. backup catalog 167). In some embodiments, the backup metadata may include at least a backup time of the backup (e.g. backup time field 262). In some embodiments, an entry in the backup catalog corresponding to a particular backup, may be linked to the entries of the data catalog corresponding to the data items stored as part of the particular backup. For example, the metadata stored by the corresponding entries of the data items (e.g. entries 281-284) may include the backup time of the backup. By way of example, although not shown in diagram 200, data catalog 165 may include an additional backup time field that stores the backup time for emails A-D (e.g. 2021-03-15T23:59).

In 304, the system may receive a request to identify a first data item (e.g. email E) stored within the set of objects. The request may include a search value (e.g. search value may include a text string "bug fixes"). The search value may include one or more search values. In some embodiments, the request to identify data (or search request) may be provided as part of a search method provided by a server API (e.g. server API 125). For example, the search request may include search information such as particular mailbox (or account) to search, and search values. In addition, the search request may specify the types of information to search. In some embodiments, the search method provided by the server API may provide the ability to specify any of the types of metadata stored by the data catalog (e.g. fields 251-259) to be specifically searched. For example, the search request may specify that the search value pertains to a subject of an email. In some embodiments, the search value may be provided as part of a data structure (e.g. structured document, object, etc.).

In 305, the system may search the set of entries within the data catalog data using the search value (e.g. search for the string "bug fixes"). In some embodiments, searching the set of entries within the data catalog data may include searching only the data catalog without accessing the set of objects. As described, in some embodiments, the request received in operation 304, may specify the types of information to search. Accordingly, the server may limit the search of the data catalog based on the specified type of information. For example, the request may specify that the subject of email is to be searched for the term "bug fixes." Accordingly, the server may search the corresponding field of the data catalog (e.g. subject field 255). This may further improve the search performance.

In 306, the system may identify a first entry, amongst the set of entries within the data catalog, corresponding to the first data item (e.g. entry 287) based on the search value matching the metadata stored by the first entry. For example, the search value of "bug fixes" may match the text stored in a field (e.g. subject field 255 of entry 287) of the first entry. It should be noted that a "match" may include a partial match, and may be based on any suitable matching technique.

In 307, the system may retrieve the first data item (e.g. email E) from a first object (e.g. object 4), amongst the set of objects, based on the metadata stored by the first entry indicating the first data item is stored within the first object (e.g. object ID 252 of entry 287 indicates that email E is stored in object 4). In some embodiments, retrieving the first data item from the first object may include identifying the first object based on the entry within the backup catalog being associated with the first entry within the data catalog. For example, the search value may include a backup time associated with the first backup and stored as part of the backup metadata associated with the first backup. In some embodiments, retrieving the first data item from the first object of the set of objects identified by the first entry may include performing a full restore of the data items stored as part of the backup.

Accordingly, in some embodiments, the system may leverage the metadata to efficiently identify backup data stored on the object storage.

Figure 4:
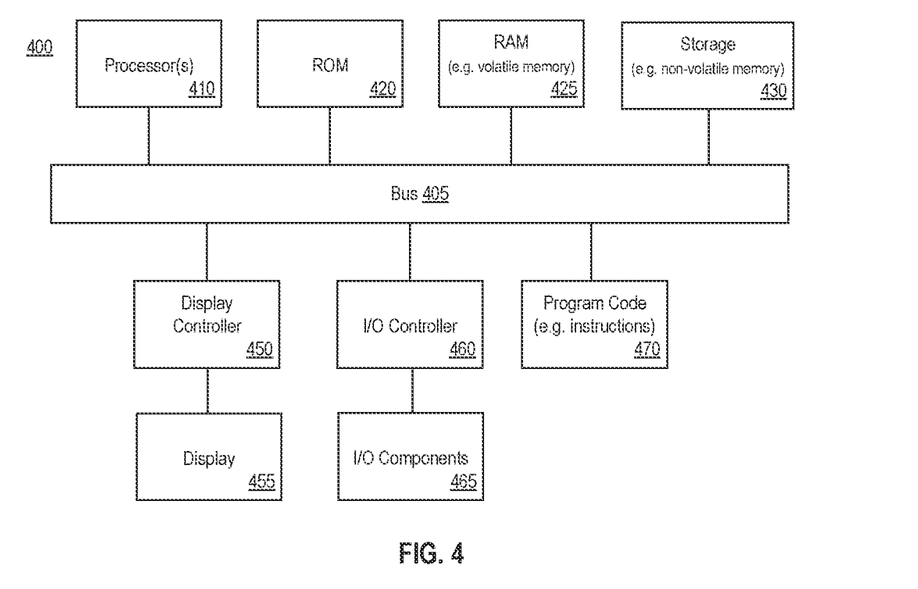
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. server 120, data manager 175, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. server 120, data manager 175, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform a backup of client data stored on a client device to a new set of objects stored on a cloud-based object storage, the client data including one or more data items each associated with one or more properties that are stored as part of the data item, the cloud-based object storage including existing objects associated with previous backups of existing client data;
   obtain, for each of the data items, the associated properties;
   store the associated properties as part of a set of entries within a data catalog, the associated properties for each data item stored as part of a corresponding entry that stores metadata of the data item;
   receive a request to identify a first data item stored within the new set of objects, the request including a search value;
   search the set of entries within the data catalog data using the search value;
   identify a first entry, amongst the set of entries within the data catalog, corresponding to the first data item based on the search value matching the metadata stored by the first entry; and
   retrieve the first data item from a first object, amongst the new set of objects, based on the metadata stored by the first entry indicating the first data item is stored within the first object.

2. The system of claim 1, wherein the plurality of instructions, when executed, further cause the one or more processors to:
   store backup metadata associated with the backup as an entry within a backup catalog, the backup metadata including at least a backup time of the backup.

3. The system of claim 2, wherein the metadata stored by the corresponding entries of the data items includes the backup time of the backup.

4. The system of claim 1, wherein the backup includes an incremental backup from a previously performed backup, and obtaining the associated properties includes obtaining changes to the properties since the previously performed backup for at least some of the data items.

5. The system of claim 1, wherein searching the set of entries within the data catalog data includes searching only the data catalog without accessing the new set of objects.

6. The system of claim 1, wherein each data item includes an email, and the one or more properties include at least one of an email subject, sender, receipt, and sent time.

7. The system of claim 1, wherein retrieving the first data item from the first object of the new set of objects identified by the first entry includes performing a full restore of the data items stored as part of the backup.

8. A method comprising:
   performing a backup of client data stored on a client device to a new set of objects stored on a cloud-based object storage, the client data including one or more data items each associated with one or more properties that are stored as part of the data item, the cloud-based object storage including existing objects associated with previous backups of existing client data;
   obtaining, for each of the data items, the associated properties;
   storing the associated properties as part of a set of entries within a data catalog, the associated properties for each data item stored as part of a corresponding entry that stores metadata of the data item;
   receiving a request to identify a first data item stored within the new set of objects, the request including a search value;
   searching the set of entries within the data catalog data using the search value;
   identifying a first entry, amongst the set of entries within the data catalog, corresponding to the first data item based on the search value matching the metadata stored by the first entry; and
   retrieving the first data item from a first object, amongst the new set of objects, based on the metadata stored by the first entry indicating the first data item is stored within the first object.

9. The method of claim 8, further comprising:
   storing backup metadata associated with the backup as an entry within a backup catalog, the backup metadata including at least a backup time of the backup.

10. The method of claim 9, wherein the metadata stored by the corresponding entries of the data items includes the backup time of the backup.

11. The method of claim 8, wherein the backup includes an incremental backup from a previously performed backup, and obtaining the associated properties includes obtaining changes to the properties since the previously performed backup for at least some of the data items.

12. The method of claim 8, wherein searching the set of entries within the data catalog data includes searching only the data catalog without accessing the new set of objects.

13. The method of claim 8, wherein each data item includes an email, and the one or more properties include at least one of an email subject, sender, receipt, and sent time.

14. The method of claim 8, wherein retrieving the first data item from the first object of the new set of objects identified by the first entry includes performing a full restore of the data items stored as part of the backup.

15. A computer program product comprising a non-transitory computer-readable medium having a computer-readable program code embodied therein to be executed by one or more processors, the program code including instructions to:
   perform a backup of client data stored on a client device to a new set of objects stored on a cloud-based object storage, the client data including one or more data items each associated with one or more properties that are stored as part of the data item, the cloud-based object storage including existing objects associated with previous backups of existing client data;

obtain, for each of the data items, the associated properties;

store the associated properties as part of a set of entries within a data catalog, the associated properties for each data item stored as part of a corresponding entry that stores metadata of the data item;

receive a request to identify a first data item stored within the new set of objects, the request including a search value;

search the set of entries within the data catalog data using the search value;

identify a first entry, amongst the set of entries within the data catalog, corresponding to the first data item based on the search value matching the metadata stored by the first entry; and retrieve the first data item from a first object, amongst the new set of objects, based on the metadata stored by the first entry indicating the first data item is stored within the first object.

16. The computer program product of claim 15, wherein the program code includes further instructions to:

store backup metadata associated with the backup as an entry within a backup catalog, the backup metadata including at least a backup time of the backup.

17. The computer program product of claim 16, wherein the metadata stored by the corresponding entries of the data items includes the backup time of the backup.

18. The computer program product of claim 15, wherein the backup includes an incremental backup from a previously performed backup, and obtaining the associated properties includes obtaining changes to the properties since the previously performed backup for at least some of the data items.

19. The computer program product of claim 15, wherein searching the set of entries within the data catalog data includes searching only the data catalog without accessing the new set of objects.

20. The computer program product of claim 15, wherein each data item includes an email, and the one or more properties include at least one of an email subject, sender, receipt, and sent time.

* * * * *